United States Patent [19]

LoCascio et al.

[11] Patent Number: 5,652,479
[45] Date of Patent: Jul. 29, 1997

[54] LAMP OUT DETECTION FOR MINIATURE COLD CATHODE FLUORESCENT LAMP SYSTEM

[75] Inventors: James J. LoCascio, San Jose; Urs Harald Mader, Santa Clara, both of Calif.

[73] Assignee: Micro Linear Corporation, San Jose, Calif.

[21] Appl. No.: 377,606

[22] Filed: Jan. 25, 1995

[51] Int. Cl.$^6$ ............................................. H05B 37/02
[52] U.S. Cl. .......................... 315/225; 315/224; 315/219; 315/291; 315/307; 315/209 R
[58] Field of Search ......................... 315/224, 225, 315/219, 206, 291, 307, 308, 209 R, 239, 121, 176, 194

[56] References Cited

U.S. PATENT DOCUMENTS

| | | | |
|---|---|---|---|
| 2,483,815 | 10/1949 | Easton | 175/356 |
| 2,967,267 | 1/1961 | Steinman et al. | 317/101 |
| 3,292,579 | 12/1966 | Buchanan | 119/5 |
| 3,549,990 | 12/1970 | Hochheiser | 323/44 |
| 3,611,021 | 10/1971 | Wallace | 315/239 |
| 3,758,823 | 9/1973 | Jett et al. | 315/219 |
| 3,772,625 | 11/1973 | Raupach | 336/94 |
| 3,778,677 | 12/1973 | Kriege | 315/219 |
| 3,840,795 | 10/1974 | Roszyk et al. | 320/2 |
| 3,921,005 | 11/1975 | Watrous | 307/64 |
| 3,953,768 | 4/1976 | Meredith et al. | 317/31 |
| 4,030,058 | 6/1977 | Riffe et al. | 336/92 |
| 4,031,449 | 6/1977 | Trombly | 320/2 |
| 4,038,625 | 7/1977 | Tompkins et al. | 336/83 |
| 4,063,108 | 12/1977 | Klett et al. | 307/64 |
| 4,144,462 | 3/1979 | Sieron et al. | 307/66 |
| 4,146,857 | 3/1979 | Schleupen | 336/61 |
| 4,172,981 | 10/1979 | Smith | 307/66 |
| 4,207,498 | 6/1980 | Spira et al. | 315/97 |
| 4,210,846 | 7/1980 | Capewell et al. | 315/121 |
| 4,251,752 | 2/1981 | Stolz | 315/206 |
| 4,260,943 | 4/1981 | Zaderej et al. | 320/21 |
| 4,277,726 | 7/1981 | Burke | 315/98 |
| 4,277,728 | 7/1981 | Stevens | 315/307 |
| 4,297,614 | 10/1981 | Chandler | 315/86 |
| 4,303,902 | 12/1981 | Lesster et al. | 336/83 |
| 4,318,608 | 3/1982 | Payne | 355/3 CH |
| 4,414,493 | 11/1983 | Henrich | 315/308 |
| 4,441,053 | 4/1984 | Daspit | 315/206 |

(List continued on next page.)

FOREIGN PATENT DOCUMENTS

| | | |
|---|---|---|
| 0 059 064 | 9/1982 | European Pat. Off. . |
| 0 178 852 | 4/1986 | European Pat. Off. . |
| 32 33 655 A1 | 5/1983 | Germany . |
| 34 32 266 A1 | 3/1985 | Germany . |
| 9201334 | 1/1992 | WIPO . |

OTHER PUBLICATIONS

Micro Linear, "Advance Information ML-4830 Electronic Ballast Controller", Jun. 1992.
Micro Linear, "Advance Information ML-4830 Electronic Ballast Controller", Jul. 1992.
J. Williams, "Techniques for 92% Efficient LCD Illumination" *Linear Technology Application Note 55*, pp. AN55-1-43, Aug. 1993.

(List continued on next page.)

*Primary Examiner*—Robert Pascal
*Assistant Examiner*—Haissa Philogene
*Attorney, Agent, or Firm*—Haverstock & Associates

[57] ABSTRACT

A circuit for supplying power to a fluorescent lamp. A control system comprises a buck regulator for supplying a buck current, an inverter circuit for receiving the buck current and for generating a lamp voltage, a circuit for sensing a current in a fluorescent lamp, a circuit for sensing a no lamp condition, and a controller for controlling the buck regulator and the inverter. The circuit for sensing a no lamp condition monitors a voltage level at the inverter transformer. The controller is coupled to the circuit for sensing a no lamp condition. If a no lamp condition is detected, the controller responds by shutting itself down. The controller can be reactivated by toggling an on/off signal to reset a latch.

20 Claims, 4 Drawing Sheets

U.S. PATENT DOCUMENTS

| | | | |
|---|---|---|---|
| 4,441,054 | 4/1984 | Bay | 315/219 |
| 4,453,109 | 6/1984 | Stupp et al. | 315/219 |
| 4,486,689 | 12/1984 | Davis et al. | 315/92 |
| 4,495,446 | 1/1985 | Brown et al. | 315/206 |
| 4,496,896 | 1/1985 | Melocik et al. | 320/2 |
| 4,498,031 | 2/1985 | Stupp et al. | 315/307 |
| 4,523,131 | 6/1985 | Zansky | 315/307 |
| 4,528,482 | 7/1985 | Merlo | 315/291 |
| 4,543,556 | 9/1985 | Taylor et al. | 336/210 |
| 4,572,988 | 2/1986 | Handler et al. | 315/209 R |
| 4,585,974 | 4/1986 | Stupp et al. | 315/307 |
| 4,604,552 | 8/1986 | Alley et al. | 315/176 |
| 4,612,479 | 9/1986 | Zansky | 315/194 |
| 4,654,573 | 3/1987 | Rough et al. | 320/2 |
| 4,686,427 | 8/1987 | Burke | 315/219 |
| 4,698,554 | 10/1987 | Stupp et al. | 315/307 |
| 4,700,113 | 10/1987 | Stupp et al. | 315/224 |
| 4,704,563 | 11/1987 | Hussey | 315/307 |
| 4,717,863 | 1/1988 | Zeiler | 315/307 |
| 4,723,098 | 2/1988 | Grubbs | 315/306 |
| 4,739,277 | 4/1988 | Anderson | 315/260 |
| 4,763,239 | 8/1988 | Ball | 363/98 |
| 4,800,328 | 1/1989 | Bolger et al. | 320/2 |
| 4,874,989 | 10/1989 | Nilssen | 315/151 |
| 4,893,059 | 1/1990 | Nilssen | 315/127 |
| 4,896,077 | 1/1990 | Dodd et al. | 315/289 |
| 4,920,299 | 4/1990 | Presz et al. | 315/98 |
| 4,935,669 | 6/1990 | Nilssen | 315/105 |
| 4,942,352 | 7/1990 | Sano | 320/2 |
| 4,952,849 | 8/1990 | Fellows et al. | 315/307 |
| 5,015,919 | 5/1991 | Vila-Masot et al. | 315/86 |
| 5,048,033 | 9/1991 | Donahue et al. | 372/38 |
| 5,049,790 | 9/1991 | Herfurth et al. | 315/291 |
| 5,111,118 | 5/1992 | Fellows et al. | 315/307 |
| 5,177,408 | 1/1993 | Marques | 315/291 |
| 5,202,608 | 4/1993 | Johnson | 315/86 |
| 5,214,352 | 5/1993 | Love | 315/86 |
| 5,216,402 | 6/1993 | Carosa | 336/66 |
| 5,237,242 | 8/1993 | Takahashi et al. | 315/123 |
| 5,264,776 | 11/1993 | Hulsey | 320/2 |
| 5,363,020 | 11/1994 | Chen et al. | 315/209 R |
| 5,367,223 | 11/1994 | Eccher | 315/97 |
| 5,367,224 | 11/1994 | Pacholok | 315/219 |
| 5,367,242 | 11/1994 | Hulman | 320/2 |
| 5,384,516 | 1/1995 | Kawabata et al. | 315/160 |
| 5,408,162 | 4/1995 | Williams | 315/224 |

OTHER PUBLICATIONS

Micro Linear, "ML4874 LCD Backlight Lamp Driver," pp. 1–6, Apr. 1994.

Micro Linear, "ML4876 LCD Backlight Lamp Driver with Contrast," pp. 1–6, Apr. 1994.

U. Mader, et al., Micro Linear, "Application Note 26—Power Conversion Efficiencies for Miniature Fluorescent Lamp," pp. 1–6, Feb. 1994.

K. Kit Sum, et al., Micro Linear, "Application Note 32—Theory and Application of the ML4874 and ML4876 LCD Backlight Controller ICs," pp.1–12, Jun. 1994.

J. J. LoCascio and U. H. Mader, "A New Control Technique Uses 25% Less Power To Drive Miniature Cold Cathode Fluorescent Lamps," *Electronic Ballast*, pp. 60–69, Apr. 1994.

M. Jordan and J.A. O'Connor, "Resonant Fluorescent Lamp Converter Provides Efficient and Compact Solution," *IEEE*, pp. 424–431, 1993.

Maxim Integrated Products, "CCFT Backlight and LCD Contrast Controllers—MAX753/MAX754," pp. 1–12, Feb. 1994.

K. Kit Sum, Micro Linear, "ML4874 Evaluation Kit User's Guide—LCD Backlight Lamp Driver," pp. 1–5, Apr. 1994.

Micro Linear, "ML4864 Evaluation User's Guide—LCD Backlight Lamp Driver with Contrast Control," pp. 1–4, Jan. 1994.

Micro Linear, "ML4864 LCD Backlight Lamp Driver with Contrast Control," pp. 1–6, Nov. 1993.

Micro Linear, "Application Note 24", p. 3.

LAMP OUT DETECTION FOR MINIATURE COLD CATHODE FLUORESCENT LAMP SYSTEM

FIELD OF THE INVENTION

This invention relates to circuits for supplying power to fluorescent lamps. More specifically, this invention relates to circuits for supplying power to miniature cold cathode fluorescent lamps that shut down when a fluorescent lamp is defective or absent from a lamp socket.

BACKGROUND OF THE INVENTION

Fluorescent lamps have "negative resistance." This means that the operating voltage decreases as power dissipation in the lamp increases. Therefore, circuits for supplying power to fluorescent lamps require a controllable alternating current power supply and a feedback loop to accurately monitor the current in the lamp in order to maintain operating stability of the circuit and to have an ability to vary the lamp brightness. Such circuits must be able to generate a high voltage to turn on the fluorescent lamp and then lower the voltage when current begins to flow in the lamp. If such a circuit is attempted to be operated when there is no lamp in the socket or a defective lamp is in the lamp socket, the voltage level in the socket will rise to a high level while waiting to sense a current in the absent or defective lamp. For purposes of this disclosure, a no lamp condition shall also mean a circuit having a lamp that is defective in a way to simulate an open circuit. This no lamp condition could damage circuit components and/or could be hazardous to humans. What is needed is a circuit for supplying power to a fluorescent lamp that senses when there is no lamp in the lamp socket and responds by shutting itself down.

Other devices have attempted to solve the problem of generating excessive voltage in the lamp socket. One such device is disclosed in Linear Technology's Application Note 55 by Jim Williams, entitled: "Techniques for 92% Efficient LCD Illumination." That device controls the output voltage when there is a open or broken lamp in the lamp socket by increasing the feedback in the lamp drive circuit. Another device is disclosed in a paper entitled: "Resonant Fluorescent Lamp Converter Provides Efficient and Compact Solution" by Mark Jordan and John A. O'Connor of Unitrode Integrated Circuits. That device disables the circuit outputs when an open lamp interrupts the current feedback loop. Both of these devices suffer from the disadvantage of continuing to consume excess power once an open lamp is detected. The Linear Technology device only limits the output voltage while allowing the lamp driver to continue operating. Further, because the Linear Technology device may put circuit components under higher thermal stress while limiting voltage at the transformer secondary, such components may need to be over-specified to survive this fault condition. The Unitrode device only disables the outputs while allowing the remainder of the circuit to continue operating. The Unitrode solution does not have means to limit the secondary transformer voltage during start-up, and could burn out a transformer during soft start at high supply voltages. The present invention does not consume excess power or suffer from these other disadvantages because it shuts down the entire lamp drive controller when a no lamp condition is present. This is an important feature to maximize the operating time of a device with a limited power supply capacity such as a battery powered lap top computer.

SUMMARY OF THE INVENTION

The invention is a circuit for supplying power to a fluorescent lamp. A control system comprises a buck regulator for supplying a buck current, an inverter circuit for receiving the buck current and for generating a lamp voltage, a circuit for sensing a current in a fluorescent lamp, a circuit for sensing a no lamp condition, and a controller for controlling the buck regulator and the inverter. The circuit for sensing a no lamp condition monitors a voltage level at the inverter transformer. The controller is coupled to the circuit for sensing a no lamp condition. If a no lamp condition is detected, the controller responds by shutting itself down. The controller can be reactivated by toggling an on/off signal to reset a latch.

DETAILED DESCRIPTION OF THE PREFERRED EMBODIMENT

Figure 1:
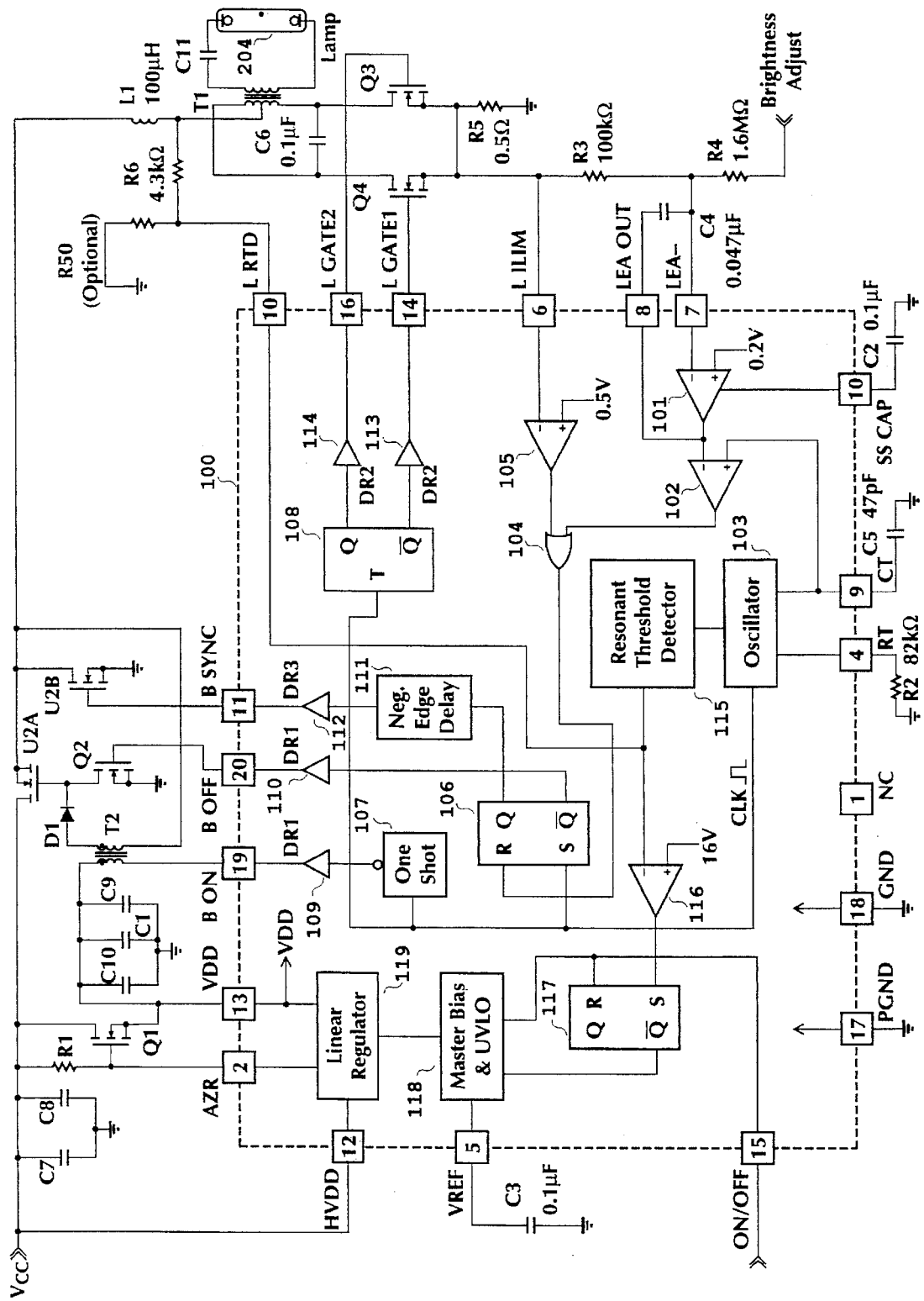
FIG. 1 shows a schematic diagram of the preferred embodiment of the present invention.

Referring to FIG. 1, a liquid crystal display (LCD) backlight integrated circuit controller 100 is shown along with external circuits that are needed to illuminate a fluorescent lamp. The integrated circuit controller 100 includes the portion of the diagram enclosed by the dotted lines. The controller 100, shown in FIG. 1 and bounded by the dotted lines, is an LCD Backlight Lamp Driver, part number ML4874, manufactured by Micro Linear Corporation, which is located at 2092 Concourse Drive, in San Jose, Calif. Micro Linear Corporation also manufactures an LCD Backlight Lamp Driver with Contrast, part number ML4876 and an LCD Backlight Lamp Driver w/Contrast Control, part number ML4864, which are similar to part number ML4874, except they have circuits to control an LCD contrast level. The controller 100 has pins 1–20 that interface with the external circuits.

Referring to portions of the diagram outside the dotted lines, a voltage source node Vcc is coupled to pin 12, to a first terminal of a capacitor C7, to a first terminal of a capacitor C8, to a first terminal of a resistor R1, to a drain of an n-channel MOSFET Q1, and to the drain of an n-channel MOSFET U2-A. A second terminal of the capacitor C7 is coupled to ground. A second terminal of the capacitor C8 is coupled to ground. A second terminal of the resistor R1 is coupled to a gate of the MOSFET Q1 and to pin 2. A source of the MOSFET Q1 is coupled to pin 13, to a first terminal of a capacitor C10, to a first terminal of a capacitor C1, to a first terminal of a capacitor C9 and to a first terminal of a primary winding of a transformer T2. A second terminal of the capacitor C10, a second terminal of the capacitor C1, and a second terminal of the capacitor C9 are coupled to ground. A second terminal of the primary winding of the transformer T2 is coupled to pin 19. A first terminal of a secondary winding of the transformer T2 is coupled to an anode of a diode D1. A second terminal of the secondary winding of the transformer T2 is coupled to a source of the MOSFET U2-A. The transformer T2 has voltage polarities of the primary and secondary windings that are the same, as shown by the dot conventions in FIG. 1. A cathode of the diode D1 is coupled to a gate of the MOSFET U2-A and to a drain of an n-channel MOSFET Q2. A source of the MOSFET Q2 is coupled to ground. A gate of the MOSFET Q2 is coupled to pin 20. A drain of an n-channel MOSFET U2-B is coupled to the source of the MOSFET U2-A. A source of the MOSFET U2-B is coupled to ground. A gate of the MOSFET U2-B is coupled to pin 11. A first terminal of an inductor L1 is coupled to the source of the MOSFET U2-A. A second terminal of the inductor L1 is coupled to a first terminal of a resistor R6 and to a center tap of a primary winding of a transformer T1. A second terminal of the resistor R6 is coupled to pin 10. A first terminal of a secondary winding of the transformer T1 is coupled to a first terminal of a fluorescent lamp 204. A second terminal of the secondary winding of the transformer T1 is coupled to a second terminal of the fluorescent lamp 204. A capacitor C11 for maintaining control stability in a lamp current feedback loop may be coupled in series with the fluorescent lamp 204, but is not always required. Further, it is known in the art that more than one fluorescent lamp may be coupled in parallel. A first terminal of the primary winding of the transformer T1 is coupled to a first terminal of a capacitor C6 and to a drain of an n-channel MOSFET Q3. A gate of the MOSFET Q3 is coupled to pin 16. A source of the MOSFET Q3 is coupled to a first terminal of a resistor R5. A second terminal of the primary winding of the transformer T1 is coupled to a second terminal of the capacitor C6 and to a drain of an n-channel MOSFET Q4. A gate of the MOSFET Q4 is coupled to pin 14. A source of the MOSFET Q4 is coupled to the first terminal of the resistor R5. The first terminal of the resistor R5 is coupled to pin 6 and to a first terminal of a resistor R3. A second terminal of the resistor R3 is coupled to a first terminal of a resistor R4, to a first terminal of a capacitor C4 and to pin 7. A second terminal of the resistor R4 is coupled to a voltage level BRIGHTNESS ADJUST to control the lamp brightness level. A second terminal of the capacitor C4 is coupled to pin 8. A first terminal of a capacitor C2 is coupled to pin 3. A second terminal of the capacitor C2 is coupled to ground. A first terminal of a capacitor C5 is coupled to pin 9. A second terminal of the capacitor C5 is coupled to ground. A first terminal of a resistor R2 is coupled to pin 4. A second terminal of the resistor R2 is coupled to ground. Pin 1 is a spare. Pin 18 and Pin 17 are coupled to ground. Pin 15 is coupled to a voltage level, ON/OFF. A first terminal of a capacitor C3 is coupled to Pin 5. A second terminal of the capacitor C3 is coupled to ground. Alternately, Q3 and Q4 could be bipolar transistors.

Referring to optional components of FIG. 1, a first terminal of a resistor R50 is coupled to pin 10. A second terminal of R50 is coupled to ground.

Referring to portions of the diagram comprising the controller 100, which are inside the dotted lines, pin 7 is coupled to an inverting input of a amplifier 101. A non-inverting input of the amplifier 101 is coupled to a reference voltage level of 0.2 volts. A terminal of the amplifier 101 is coupled to pin 3 to couple the optional soft start capacitor C2 to the amplifier 101. An output of the amplifier 101 is coupled to pin 8 and to an inverting input of a comparator 102. Pin 9 is coupled to a first terminal of an oscillator 103 to set the oscillation frequency with the timing capacitor C5. The non-inverting input to the comparator 102 is also coupled to pin 9. An output of the comparator 102 is coupled to a first input to an OR gate 104. An inverting input to a comparator 105 is coupled to pin 6. A non-inverting input to the comparator 105 is coupled to a voltage reference level of 0.5 volts. An output of the comparator 105 is coupled to a second input to the OR gate 104. An output of the OR gate 104 is coupled to a RESET terminal of a flip-flop 106. A second terminal of the oscillator 103 is coupled to pin 4 to set the oscillation frequency of the oscillator 103 with the timing resistor R2. A third terminal of the oscillator 103 is coupled to deliver a clock signal to a SET terminal of the flip-flop 106, to a first terminal of a one-shot circuit 107 and to a TOGGLE input to a flip-flop 108. A second terminal of the one-shot circuit 107 is coupled to an input terminal to a buffer 109. An output terminal of the buffer 109 is coupled to pin 19. A Q-not output of the flip-flop 106 is coupled to an input to a buffer 110. An output of the buffer 110 is coupled to pin 20. A Q output of the flip-flop 106 is coupled to an input of a negative edge delay 111. An output of the negative edge delay 111 is coupled to an input to a buffer 112. An output of the buffer 112 is coupled to pin 11. A Q-not output of the flip-flop 108 is coupled to an input to a buffer 113. An output of the buffer 113 is coupled to pin 14. A Q output of the flip-flop 108 is coupled to an input to a buffer 114. An output of the buffer 114 is coupled to pin 16. A forth terminal of the oscillator 103 is coupled to receive a signal from a first terminal of a resonant threshold detector 115 to synchronize the oscillator 103. Pin 10 is coupled to, deliver a zero voltage level signal to a second terminal of the resonant threshold detector 115 and to an inverting input to an error amplifier 116. A non-inverting input to the amplifier 116 is coupled to a reference voltage level of 16 volts. An output of the amplifier 116 is coupled to a SET input to a flip-flop 117. A Q-not output of the flip-flop 117 is coupled to deliver a control signal to a first terminal of a master bias & uvlo 118 to shut down power to the fluorescent lamp if a voltage at pin 10 exceeds 16 volts. Pin 15 is coupled to a second terminal of the master bias & uvlo 118 and to a RESET input to the flip-flop 117 to restore power to the fluorescent lamp after a shut down by toggling the voltage level at pin 15. A third terminal of the master bias & uvlo 118 is coupled to deliver a reference voltage level to pin 5. A forth terminal of the master bias & uvlo 118 is coupled to receive power from a first terminal of a linear regulator 119. A second terminal of the linear regulator 119 is coupled to receive power from pin 12. A third terminal of the linear regulator 119 is coupled to pin 2. Internal to the linear regulator 119, the third terminal of the linear regulator 119 is coupled to a cathode of a Zener diode DAZR (not shown). The anode of the diode DAZR is coupled to ground. A forth terminal of the linear regulator 119 is coupled to pin 13 and coupled to provide a supply voltage to the circuits within the dotted lines.

An invertor comprises T1, C6, LAMP, Q3, Q4 and R5. The inverter is known in the art as comprising a current fed Royer-type inverter. A resonant tank circuit comprises C6 and the primary winding of the transformer T1. Q3 and Q4 comprise a push-pull transistor pair. The controller 100 alternately turns Q3 and Q4 on. This draws current from the resonant tank circuit which in turn generates a voltage across the secondary winding of T1 to power the lamp. When a voltage at the center tap of the transformer reaches a zero voltage level, the controller turns on either Q3 or Q4 and turns off the other. Because the controller alternates only at zero voltage levels, the tank circuit is driven at its resonant frequency. An internal oscillator 103 provides the switching signals for start-up. The current through R5 is substantially proportional to the current through the lamp. The current through the lamp is substantially sinusoidal. The current drawn by Q3 and Q4 generates a voltage at Pin 6 which is sensed and monitored by the controller so the lamp current can be monitored for an over current condition. The voltage at the node that comprises the source of Q3, the source of Q4 and the first terminal of R5 is coupled to the inverting input of the amplifier 101 through R3. The output of the amplifier 101 is coupled to control the duty cycle of the buck regulator. The inverter does not regulate the lamp brightness by varying the switching frequency because the inverter drives the lamp at the resonant frequency of the tank circuit.

A buck regulator has power processing components which are: a primary switch U2-A, a synchronous rectifier U2-B, and a buck inductor L1. The primary switch, U2-A, has a high side drive circuit which consists of T2, D1, and Q2. The buck regulator provides a dc current signal to the inverter circuit though L1. The fluorescent lamp brightness is regulated by the controller by varying a duty cycle of the buck regulator. The buck regulator is synchronized to the inverter, and will turn U2-A on when the inverter transistors, Q3 and Q4, change state. U2-A and U2-B have a high current capacity, and in the preferred embodiment, are each a Dual 20 v, 0.10 Ohm, n-channel, MOSFET transistor manufactured by Motorola, under part number MMDF2N02. After a time determined by a lamp current feedback signal, U2-A is turned off and U2-B is turned on. U2-B stays on until the inverter transistors, Q3 and Q4, change state and U2-A is turned on again. In this way, the controller controls the duty cycle of the buck regulator. U2-B may be replaced with a rectifier, but the efficiency of the system may suffer.

The controller drives the gate of U2-A through the miniature pulse transformer T2. T2 can be made with a ferrite bead with one turn on the primary winding and two turns on the secondary winding. Alternatively, T2 may be a low cost, surface mount transformer, such as part number CP-4LBM, which is available from Sumida, 637 East Golf Road, Suite 209, Arlington Heights, Ill., 60005. When a controller output, a signal B-ON, is activated, the voltage generated at the secondary winding of T2 is greater than the voltage level of the signal B-ON because of the transformer. B-ON is a logic level voltage of approximately 5 volts. When the signal B-ON is activated, the diode D1 becomes forward biased so that the gate of U2-A becomes charged to a higher potential than B-ON (to approximately 10 volts). When B-ON is deactivated, the diode D1 then becomes reverse biased which captures the charge on the gate of U2-A and keeps U2-A turned on. When the signal B-OFF is activated, the gate of Q2, a small signal device, is driven high by the controller. This turns Q2 on and causes the charge captured on the gate of U2-A to drain off to ground through Q2, turning U2-A off.

Figure 2:
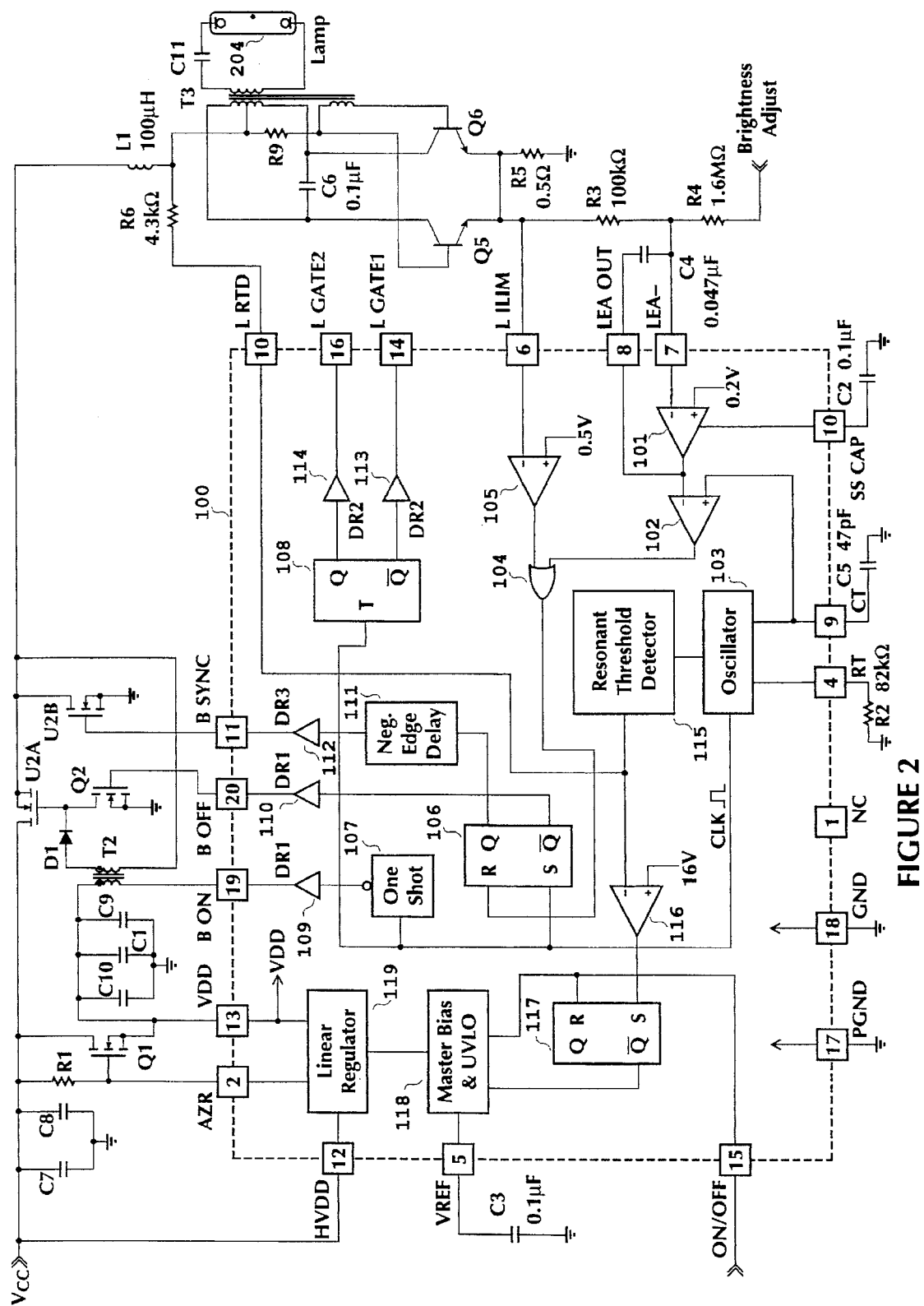
FIG. 2 shows a schematic diagram of a first alternate embodiment of the present invention.

Referring to FIG. 2, a schematic diagram of a first alternate embodiment of the present invention is shown. The circuit shown in FIG. 2 is substantially the same as the circuit shown in FIG. 1, as discussed above, except for the differences discussed below. The primary difference, from which the other differences arise, is that the circuit shown in FIG. 2 drives the push-pull transistor pair with an additional winding of a transformer T3 whereas the circuit shown in FIG. 1 drives the push-pull transistor pair with control signals from the controller 100. A first terminal of an inductor L1 is coupled to the source of the MOSFET U2-A. A second terminal of the inductor L1 is coupled to a first terminal of a resistor R6 and to a center tap of a first primary winding of a transformer T3. The second terminal of the inductor L1 is also coupled to a first terminal of a resistor R9. A second terminal of the resistor R6 is coupled to pin 10. A first terminal of the first primary winding of the transformer T3 is coupled to a first terminal of a capacitor C6 and to a collector of an npn bipolar transistor Q5. A second terminal of the first primary winding of the transformer T3 is coupled to a second terminal of the capacitor C6 and to a collector of an npn bipolar transistor Q6. A second terminal of the resistor R9 is coupled a first terminal of a second primary winding of the transformer T3 and to a base of the transistor Q5. A second terminal of the second primary winding of T3 is coupled to a base of the transistor Q6. A first terminal of a secondary winding of T3 is coupled to a first terminal of a fluorescent lamp 204. A second terminal of the secondary winding of T3 is coupled to a second terminal of the fluorescent lamp 204. A capacitor C11 for maintaining control stability in a lamp current feedback loop may be coupled in series with the fluorescent lamp 204, but is not always required. An emitter of the transistor Q5 and an emitter of the transistor Q6 are coupled to a first terminal of a resistor R5. The transistors Q5 and Q6 comprise a push-pull transistor pair. The first terminal of the resistor R5 is also coupled to pin 6 and to a first terminal of a resistor R3. A second terminal of the resistor R5 is coupled to the ground node. A second terminal of the resistor R3 is coupled to a first terminal of a resistor R4 and to a first terminal of a capacitor C4 and to pin 7. A second terminal of the capacitor C4 is coupled to pin 8. A second terminal of the resistor R4 is coupled to a voltage level BRIGHTNESS ADJUST. The voltage level at the center tap of T3 serves to bias the base of Q5 and the base of Q6 through the second primary winding of T3 so that the resultant operation of the inverter circuit shown in FIG. 2 is substantially the same as the operation of the inverter circuit shown in FIG. 1. Alternately, Q5 and Q6 could be MOSFET transistors which are driven by the second primary winding of T3.

Figure 3:
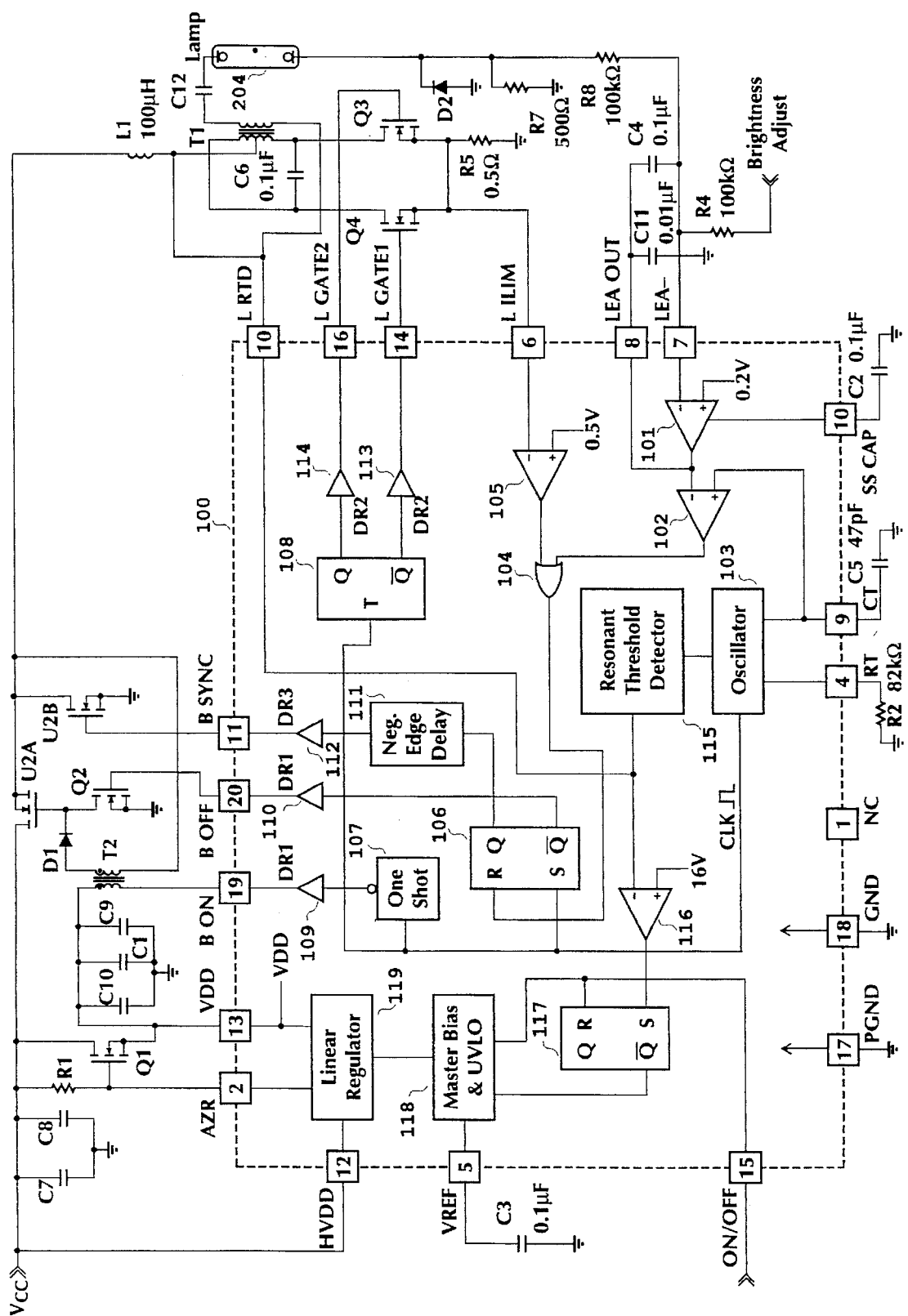
FIG. 3 shows a schematic diagram of a second alternate embodiment of the present invention.

Referring to FIG. 3, a schematic diagram of a second alternate embodiment of the present invention is shown. The circuit shown in FIG. 3 is substantially the same as the circuit shown in FIG. 1, as discussed above, except for the differences discussed below. The primary difference, from which the other differences arise, is that the circuit shown in FIG. 3 senses a current representative of the lamp current on the secondary side of the transformer T1 whereas the circuit shown in FIG. 1 senses a current representative of the lamp current on the primary side of T1. A first terminal of an inductor L1 is coupled to the source of the MOSFET U2-A. A second terminal of the inductor L1 is coupled to pin 10 and to a center tap of a primary winding of a transformer T1 and to a first terminal of a secondary winding of the transformer T1. A first terminal of the primary winding of the transformer T1 is coupled to a first terminal of a capacitor C6 and to a drain of an n-channel MOSFET Q3. A second terminal of the primary winding of the transformer T1 is coupled to a second terminal of the capacitor C6 and to a drain of an n-channel MOSFET Q4. A gate of the MOSFET Q3 is coupled to pin 16. A source of the MOSFET Q3 is coupled to a first terminal of a resistor R5. A gate of the MOSFET Q4 is coupled to pin 14. A source of the MOSFET Q4 is coupled to the first terminal of the resistor R5. The first terminal of the resistor R5 is coupled to pin 6. The second terminal of the resistor R5 is coupled to the ground node. A second terminal of the secondary winding of T1 is coupled to a first terminal of a capacitor C12. A second terminal of the capacitor C12 is coupled to a first terminal of a fluorescent lamp 204. The ballast capacitor C12 is for maintaining control stability in a lamp current feedback loop, but is not always required. Alternately two lamps may be coupled in parallel. If two lamps are used, a ballast capacitor is required to be coupled in series with each lamp. A second terminal of the fluorescent lamp 204 is coupled to a cathode of a diode D2 and to a first terminal of a resistor R7 and to a first terminal of a resistor R8. An anode of the diode D2 is coupled to the ground node. A second terminal of the resistor R7 is coupled to the ground node. A first terminal of a resistor R4 is coupled to a voltage level BRIGHTNESS ADJUST. A second terminal of the resistor R4 is coupled to a first terminal of a capacitor C4, to a second terminal of the resistor R8 and to pin 7. A second terminal of the capacitor C4 is coupled to pin 8 and to a first terminal of a capacitor C11. A second terminal of the capacitor C11 is coupled to the ground node. Alternately, Q3 and Q4 could be bipolar transistors.

Figure 4:
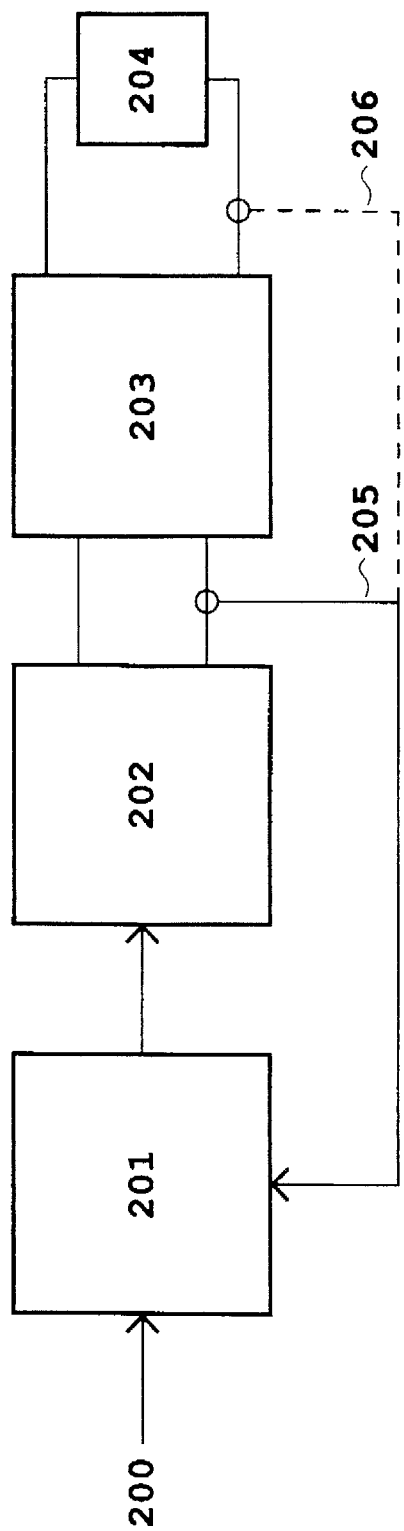
FIG. 4 shows a block diagram of a closed loop control system of the present invention.

Referring now to FIG. 4, a control loop of the present invention is shown. A reference signal 200 is supplied to a controller 201 to control a brightness level of the lamp 204. A feedback signal 205 is also supplied to the controller 201. Alternately, a feedback signal 206 is, supplied to the controller 201. The feedback signal 205 corresponds to the primary side lamp current sensing shown in FIG. 1 whereas the feedback signal 206 corresponds to the secondary side lamp current sensing shown in FIG. 3. The controller 201 controls a duty cycle of a buck regulator 202 based on the reference signal 200 and a feedback signal 205 or 206. The buck regulator 202 supplies current to an inverter 203 which powers the lamp 204. A current in the lamp is sensed and fed back to the controller 201 through the feedback signal 205 or 206 that is representative of the current in the lamp.

Fluorescent lamps of the type contemplated for use with this invention have negative resistance under certain frequencies and voltage levels. This means that the operating voltage decreases as power dissipation in the lamp increases. Referring to FIG. 1, the lamp 204 is mounted in a lamp socket. The lamp socket is coupled to the circuit for supplying power to the lamp. When there is no lamp in the socket and the circuit for supplying power to the lamp is turned on, the output voltage in the lamp socket will tend to rise to a high level anticipating the start of an actual lamp. This condition is sensed by resistor R6 which is coupled to pin 10. The voltage level at pin 10 is applied to the inverting input to the amplifier 116. A 16 volt reference voltage is coupled to the non-inverting input of the amplifier 116. The output of the amplifier sets the latch 117. The output of the latch 117 signals the master bias & uvlo circuit 118 to shut down the linear regulator 119 and thereby disables the controller 100. Thus, when the voltage at pin 10 rises above 16 volts, the controller 100 will suppress the output voltage to the lamp socket by shutting down. The latch 117 can be reset and power restored to the controller 100 by toggling the logic level at pin 15, the ON/OFF input to the controller 100.

To accommodate different lamp types, sometimes it is desirable to have a voltage higher than 16 volts at the center tap of the transformer T1. In this event, the resistor R50 can be added between pin 10 and ground to form a voltage divider.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent that to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, frequencies and voltage levels disclosed herein.

What is claimed is:

1. A circuit for supplying power to a fluorescent lamp comprising:

a. controller circuit;
 b. a buck regulator for forming a buck current signal wherein the buck regulator is coupled to be controlled by the controller circuit;
 c. an inverter for forming a lamp signal, the inverter having an input node, wherein the input node is coupled to receive the buck current signal;
 d. a sensing circuit for forming a sensing signal representative of a voltage at the input node; and
 e. means for deactivating the controller circuit if the sensing signal exceeds a reference voltage level.

2. The circuit according to claim 1 wherein the means for deactivating comprises:

a. a comparator having an inverting input, a non-inverting input and a control output, wherein the inverting input is coupled to receive the sensing signal and wherein the non-inverting input is coupled to receive the reference voltage level; and
 b. a latch coupled to the control output for receiving the control signal wherein the controller is deactivated when the sensing signal exceeds the reference voltage.

3. The circuit according to claim 1 wherein the inverter comprises:

a. a transformer having a primary winding and a secondary winding, the primary winding having a first primary terminal, a second primary terminal and a center tap, the secondary winding having a first secondary terminal and a second secondary terminal, wherein the center tap is coupled to the input node;
 b. a capacitor having a first capacitor terminal and a second capacitor terminal wherein the first capacitor terminal is coupled to the first primary terminal and the second capacitor terminal is coupled to the second primary terminal;
 c. a first transistor having a first drain, a first source and a first gate, wherein the first drain is coupled to the first primary terminal and the first gate is coupled to be controlled by the controller;
 d. a second transistor having a second drain, a second source and a second gate, wherein the second drain is coupled to the second primary terminal and the second gate is coupled to be controlled by the controller; and
 e. a resistor having a first resistor terminal and a second resistor terminal wherein the first resistor terminal coupled to the second source and to the first source and the second resistor terminal is coupled to a ground node.

4. The circuit according to claim 3 further comprising a lamp socket having a first lamp socket terminal and a second lamp socket terminal wherein the first lamp socket terminal is coupled to the first secondary terminal and the second lamp socket terminal is coupled to the second secondary terminal, wherein the voltage at the input node exceeds the reference voltage level when there is no fluorescent lamp mounted in the lamp socket.

5. The circuit according to claim 3 further comprising:

a. a fluorescent lamp having a first lamp terminal and a second lamp terminal wherein the first lamp terminal is coupled to the first secondary terminal and the second lamp terminal is coupled to the second secondary terminal;
 b. means for sensing a current in the lamp coupled to the inverter; and
 c. a feedback pathway for controlling a duty cycle of the buck regulator in response to the current in the lamp.

6. The circuit according to claim 1 wherein the sensing circuit comprises a first resistor having a first resistor terminal and a second resistor terminal wherein the first resistor terminal is coupled to the input node and the second resistor terminal is coupled to the means for deactivating.

7. The circuit according to claim 6 wherein the sensing circuit further comprises a second resistor having a first resistor terminal and a second resistor terminal wherein the first resistor terminal of the second resistor is coupled to the second resistor terminal of the first resistor and the second resistor terminal of the second resistor is coupled to the ground node.

8. The circuit according to claim 6 wherein the means for deactivating comprises:
   a. a comparator having an inverting input a non-inverting input and a comparator output, wherein the inverting input is coupled to the second resistor terminal, the non-inverting input is coupled to receive the reference voltage; and
   b. a latch having a first logic state and a second logic state wherein the latch is coupled to the comparator output to assert the second logic state if the sensing signal exceeds the reference voltage level.

9. The circuit according to claim 8 wherein the reference voltage level is 16 volts.

10. The circuit according to claim 8 further comprising a linear regulator for supplying power to the controller wherein the linear regulator is coupled to be shut down in response to the second logic state.

11. The circuit according to claim 10 wherein the latch is coupled to assert the first logic state in response to toggling an input voltage level to the controller.

12. The circuit according to claim 11 wherein the linear regulator is coupled to supply power in response to the first logic state.

13. A circuit for supplying power to a fluorescent lamp comprising:
   a. a controller;
   b. a buck regulator for forming a buck current signal coupled to be controlled by the controller;
   c. a transformer having a primary winding and a secondary winding, the primary winding having a center tap, wherein the center tap is coupled to receive the buck current signal; and
   d. means for shutting down the controller if no fluorescent lamp is coupled to the secondary winding, the means for shutting down coupled to the center tap.

14. The circuit according to claim 13 wherein the means for shutting down comprises:
   a. means for sensing a voltage at the center tap;
   b. means for comparing the voltage at the center tap to a reference voltage level; and
   c. means for suppressing a power supply to the controller if the voltage at the center tap exceeds the reference voltage level.

15. A circuit for supplying power to a fluorescent lamp comprising:
   a. a controller for controlling a circuit for supplying voltage to a fluorescent lamp;
   b. a controller power supply circuit coupled to the controller; and
   c. a circuit coupled to the controller power supply circuit for shutting down the controller power supply circuit when no fluorescent lamp is coupled to the circuit for supplying voltage to the fluorescent lamp.

16. The circuit for supply power according to claim 15 wherein the circuit for supplying voltage comprises:
   a. a buck regulator for delivering a buck current signal to a node coupled to the controller; and
   b. an inverter circuit for receiving the buck current signal from the node coupled to the controller.

17. The circuit for supplying power according to claim 16 wherein a voltage at the node exceeds a predetermined level when no fluorescent lamp is coupled to the circuit for supplying voltage to the fluorescent lamp.

18. A circuit for supplying power to a fluorescent lamp comprising:
   a. a controller for controlling a circuit for supplying voltage to a fluorescent lamp;
   b. a controller power supply circuit coupled to the controller; and
   c. a circuit coupled to the controller power supply circuit for shutting down the controller power supply circuit when a defective fluorescent lamp is coupled to the circuit for supplying voltage to the fluorescent lamp.

19. The circuit for supply power according to claim 18 wherein the circuit for supplying voltage comprises:
   a. a buck regulator for delivering a buck current signal to a node coupled to the controller; and
   b. an inverter circuit for receiving the buck current signal from the node coupled to the controller.

20. The circuit for supplying power according to claim 19 wherein a voltage at the node exceeds a predetermined level when the defective fluorescent lamp is coupled to the circuit for supplying voltage to the fluorescent lamp.

* * * * *